United States Patent [19]

Tsuiki et al.

[11] 4,300,136
[45] Nov. 10, 1981

[54] DISPLAY PATTERN PREPARING SYSTEM

[75] Inventors: Hideo Tsuiki; Yoshiyasu Kikuchi; Hiroshi Kirii; Koji Nakamura, all of Tokyo, Japan

[73] Assignee: Nippon Electric Co., Ltd., Tokyo, Japan

[21] Appl. No.: 147,976

[22] Filed: May 8, 1980

[30] Foreign Application Priority Data

May 10, 1979 [JP] Japan .................................. 54-57268
Sep. 28, 1979 [JP] Japan ................................ 54-124979
Oct. 1, 1979 [JP] Japan ................................ 54-126672

[51] Int. Cl.³ .......................................... G06F 3/153
[52] U.S. Cl. .................................. 340/747; 340/799
[58] Field of Search ............................... 340/744, 747

[56] References Cited

U.S. PATENT DOCUMENTS

| 3,792,464 | 2/1974 | Hamada et al. | 340/747 |
| 3,812,491 | 5/1974 | Barraclough et al. | 340/747 |
| 4,188,627 | 2/1980 | Alexander et al. | 340/747 |
| 4,241,341 | 12/1980 | Thorson | 340/744 |

Primary Examiner—David L. Trafton

Attorney, Agent, or Firm—Townsend and Townsend

[57] ABSTRACT

A display pattern preparing system for forming picture element series data for formation and display of picture images by raster scanning. "Figure" or "Configuration" of a pattern is disassembled to be normalized. An fixed pattern memory stores, as a registered configuration data, the length of a segment by which a fixed pattern of a prescribed configuration and area crosses a scanning line in the primary direction of scanning. An analogous pattern memory stores, as parameters, a reference position data representative of a reference point for a portion of an analogous pattern through which the analogous pattern overlaps the scanning line, the analogous pattern being defined as a pattern whose configuration is analogously variable, a distance data representative of the length of the portion of the analogous pattern, and a change ratio data representative of a ratio at which the reference point changes in the auxiliary direction of scanning. The data of the fixed pattern and analogous pattern memories are read out for preparation of a position data for display of a pattern designated by the read-out data. The position data is transmitted to display units.

13 Claims, 34 Drawing Figures

| ADDRESS | DATA | |
|---|---|---|
| T | d0L | d0R |
| T+1 | d1L | d1R |
| T+2 | d2L | d2R |
| . | . | . |
| . | . | . |
| T+n | dnL | dnR |
| . | . | . |
| . | . | . |

| ADDRESS | DATA |
|---|---|
| | |
| | . |
| | . |
| M | 1000 |
| M+1 | OR |
| 2 | Xa |
| 3 | $\Delta$Xa |
| 4 | $\Delta$Ya |
| 5 | R |
| 6 | Xb |
| 7 | T |
| 8 | $\Delta$Yb |
| 9 | R |
| 10 | Xd |
| 11 | T |
| 12 | $\Delta$Yd |
| 13 | OR |
| 14 | Xd |
| 15 | $\Delta$Xd |
| 16 | $\Delta$Yd |
| 17 | E |
| 18 | — |
| 19 | — |
| 20 | — |
| | . |
| | . |

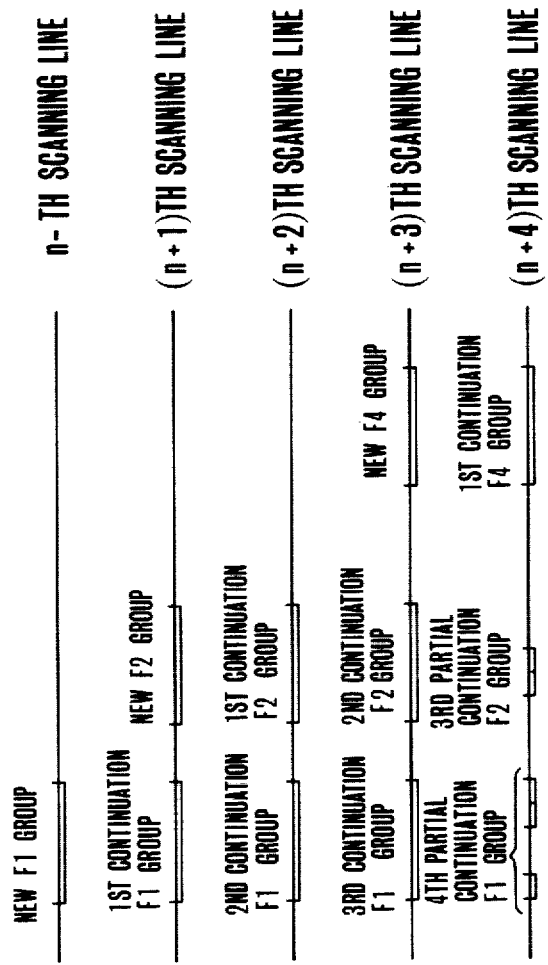

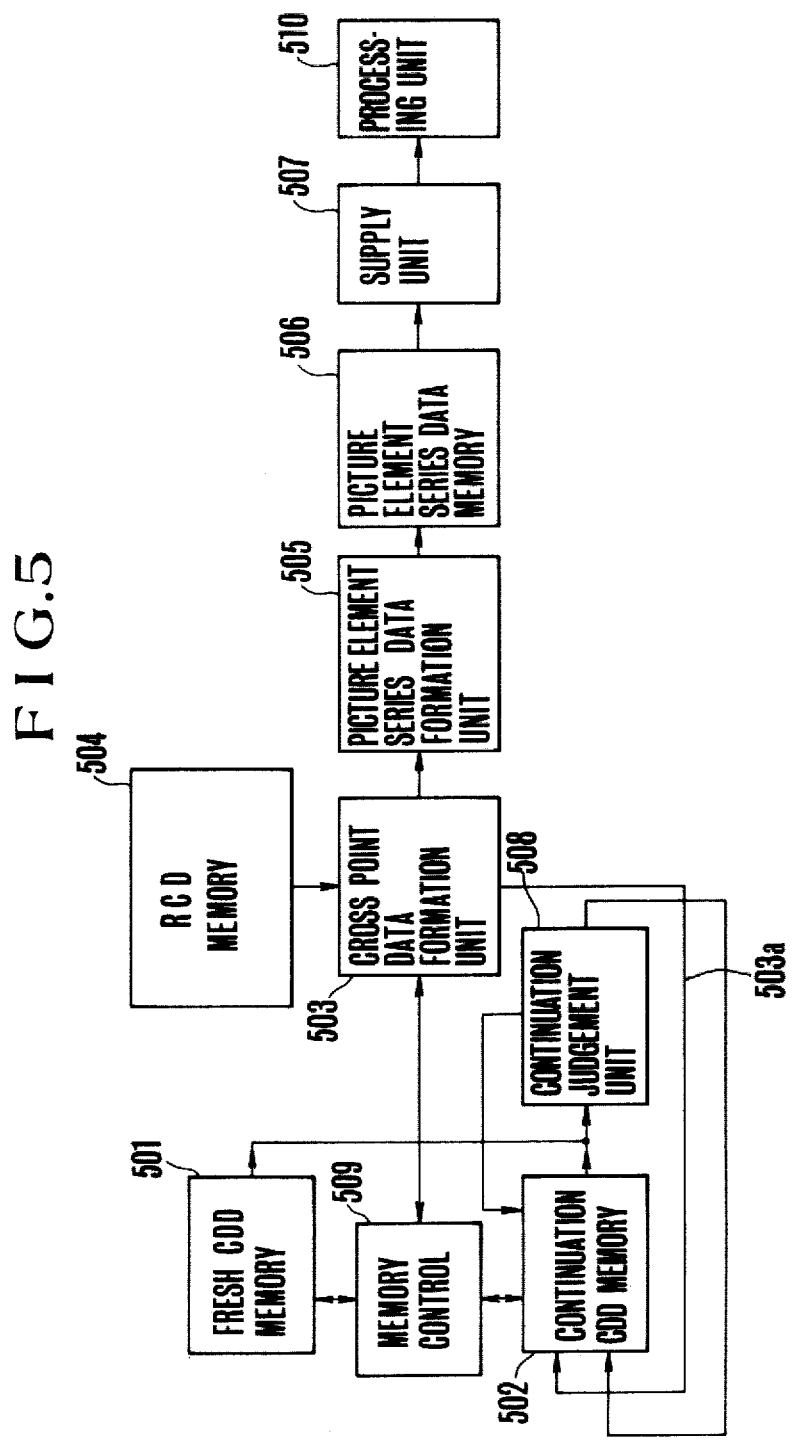

FIG.8
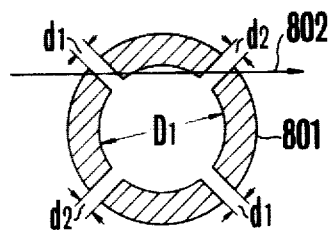
FIG.9
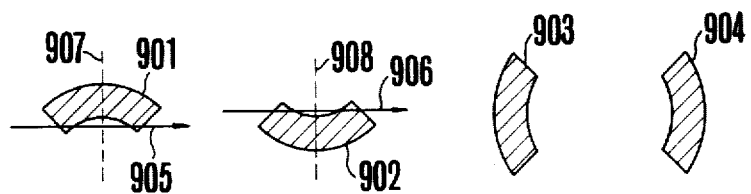
FIG.10
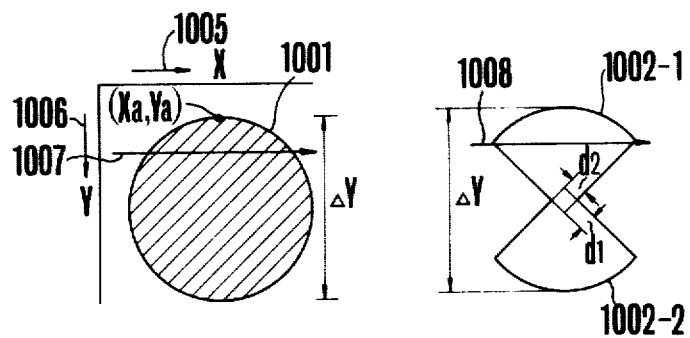
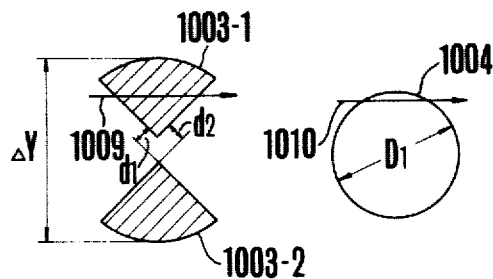

FIG.15
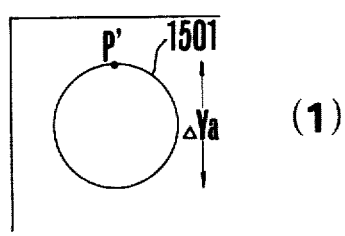
(1)     (1)'
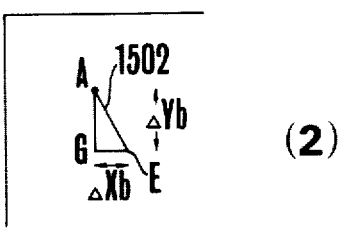
(2)     (2)'
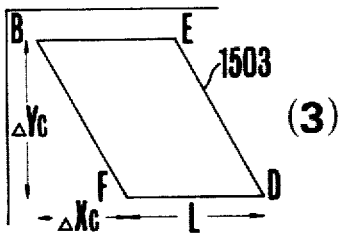
(3)     (3)'
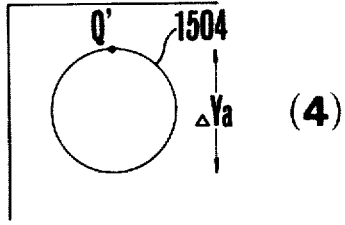
(4)     (4)'
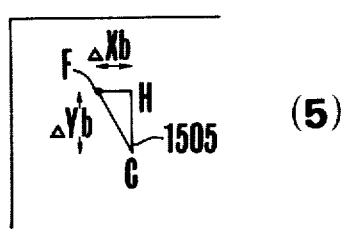
(5)     (5)'

DISPLAY PATTERN PREPARING SYSTEM

BACKGROUND OF THE INVENTION

The present invention generally relates to a display pattern preparing system and in particular a system for forming picture element series data for raster from data for contour control for the sake of formation and display of picture images.

In the conventional art, a master for printed wiring board wiring is drawn by obtaining data of contour control from a design drawing and then moving in accordance with the data a mechanical head such as of an X-Y plotter in a vector fashion over a plane on which the master is to be formed. This method, however, is defective in that several tens of hours are required for drawing a master of a large area and a high density.

Although the time may be radically shortened if a master is drawn and displayed by way of raster-scanning using an electro-optical means, there is required a system for forming picture elements series data for raster from the contour control data. Disclosed in U.S. Pat. No. 3,812,491 to C. G. Barraclough entitled "Raster-scanned Display Devices" is a device wherein an image is formed electrically and a video signal corresponding to the image is supplied to a raster-scanned display unit such as CRT. This device, however, requires calculation in terms of vectors to produce a picture element series data and has no storage function to memorize a given pattern, thus giving rise to prolonged calculations. Especially, for complicated patterns, the device of extremely sophisticated is required. Another prior art is known in which a pattern to be displayed is directly stored in a memory. Obviously, this prior art requires a large number of memories to deal with a complicated pattern and hence becomes expensive.

SUMMARY OF THE INVENTION

The present invention has for its prime object to provide a display pattern preparing system for forming picture element series data for formation and display of picture images by raster scanning which is simplified to be adaptive to universal usage.

Another object of the present invention is to provide the manner of normalization of a pattern for formation of picture element series data.

According to this invention, there is provided a display pattern preparing system comprising:

a fixed pattern memory storing, as a registered configuration data, the length of a segment by which a fixed pattern of a prescribed configuration and area crosses a scanning line in the primary direction of scanning;

an analogous pattern memory storing, as parameters, a reference position data representative of a reference point for a portion of an analogous pattern through which the analogous pattern overlaps the scanning line, said analogous pattern being defined as a pattern whose configuration is analogously variable, a distance data representative of the length of said portion of the analogous pattern, and a height data representative of a width of the analogous pattern in the auxiliary direction of scanning;

means for reading out said data from said fixed pattern memory and said analogous pattern memory;

means for preparing a position data for display of a pattern designated by the read-out data; and means for transmitting said position data to a display unit.

In accordance with a preferred embodiment of the invention, a system for forming picture element series data comprises:

a first configuration description data memory unit for storing configuration description data groups aligned in the order of their generation in the auxiliary direction of scanning;

a second configuration description data memory unit for storing configuration description data groups which are being continuously processed;

a memory control unit for controlling configuration description data memory units;

a registered configuration data memory unit for storing registered configuration data groups indicating lengths of a prescribed configuration by which the prescribed configuration crosses the raster;

a cross data point formation unit which receives configuration description data from said first or second configuration description data memory unit and refers to the registered configuration data stored within said registered configuration data memory unit to form a cross point data representative of the position where the scanning raster crosses the configuration corresponding to said configuration description data;

a continuation judging unit which judges whether or not said configuration crosses the ensuing raster and processes configuration description data which is the basis for said configuration for continuation, when said configuration crosses the ensuing raster, to cause this continuation data to be stored in the second configuration description data memory unit;

a picture element series data formation unit which forms a picture element series data based on the cross point data received from said cross point data formation unit;

a picture element series data memory unit for storing picture element series data associated with at least one scanning line of the raster; and a supply unit for supplying the picture element series data associated with the one scanning line which has been formed in said picture element series data memory unit to a subsequent processing unit.

In accordance with another preferred embodiment of the invention, a system for forming picture element series data comprises:

a first figure description data memory unit for storing figure description data groups aligned in the order of their generation in the auxiliary direction of scanning;

a second figure description data memory unit for storing figure description data being continuously processed;

a memory control unit for controlling figure description data memory units;

a registered configuration data memory unit for storing registered configuration data groups indicating lengths of portions of a prescribed normalized configuration by which the prescribed normalized configuration crosses the raster;

a cross point data formation unit which receives figure description data from said first or second figure description data memory unit and refers to the registered configuration data of said registered configuration memory unit to form a cross point data representative of the position where the scanning raster crosses the configuration corresponding to said figure description data;

a continuation judging unit which judges whether or not said configuration crosses the ensuing raster, and when having judged that said configuration crosses the raster, processes figure description data for continuation and causes the same to be stored in the second figure description data memory unit;

a picture element series data memory unit for storing the picture element series data associated with at least one scanning line of the raster;

a memory selection unit for forming a signal which selects from said picture element series data memory unit memory elements corresponding to picture elements between two cross points of said cross point data;

a tone control unit for causing tone data in the figure description data to be stored in the memory elements selected by said memory selecting unit; and a supply unit for supplying the picture element series data associated with one scanning line which has been formed in said picture element series data memory unit to a subsequent processing unit.

In accordance with still another preferred embodiment of the invention, a system for forming picture element series data comprises:

a first configuration description data memory unit for storing registered configuration description data groups aligned in the order of their generation in the auxiliary direction of scanning and configuration description data descriptive of a parallelogram of which one set of opposing sides is parallel to the primary direction of scanning and a right angle triangle of which two sides subtending right angles are parallel to the primary or auxiliary direction of scanning;

a second configuration description data memory unit for storing configuration description data groups being continuously processed;

a memory control unit for controlling said two memory units;

a registered configuration data memory unit for storing registered configuration data groups indicating relative position of the points where the registered configuration crosses the raster;

a cross point data formation unit which receives configuration description data from said first or second memory unit and refers to registered configuration data in said registered configuration data memory unit as the need arises to form a cross point data representative of absolute position where the scanning raster crosses the configuration represented by said configuration description data;

a continuation judging unit for judging whether or not said configuration crosses the ensuing raster and when having judged that said configuration crosses the raster, processes said configuration description data for continuation and causes the same to be stored in the second configuration description data memory unit;

a picture element series data memory unit for storing the picture element series data associated with at least one scanning line of the raster;

a memory selecting unit for selecting memory elements corresponding to picture elements between the two cross points of said cross point data from said picture element series data memory unit to cause a signal indicating that the figure exists to be stored; and a supply unit for supplying the picture element series data associated with one scanning line which has been formed in the picture element series data memory unit to a subsequent processing unit.

BRIEF DESCRIPTION OF THE DRAWINGS

FIG. 3A shows a storage format in a fresh configuration description data memory unit;

FIGS. 3B to 3H show the manner of controlling in a configuration description data memory unit;

FIG. 4 is a diagrammatic representation useful in explaining the manner of arrangement of configuration description data in respect of scanning lines of the raster;

FIG. 5 is a block diagram of one embodiment of the invention;

FIG. 8 is a diagrammatic representation showing a complicated pattern to be processed in accordance with the invention;

FIGS. 9 and 10 show the manner of normalization of the pattern of FIG. 8;

FIGS. 12A to 12E are diagrammatic representation useful in explaining the manner of overlapping in accordance with the invention;

FIG. 15 illustrates in sections (1) through (5) the manner of formation of picture element series data of normalized patterns for the patterns in FIGS. 13A and 13B, and in sections (1)' through (5)' storage format of respective normalized patterns;

DESCRIPTION OF PREFERRED EMBODIMENTS

Preferred embodiments of the present invention will now be described with reference to the accompanying drawings, and terms used hereinafter are annotated for reference purposes. The concepts of "figure", "configuration" and their "normalization" used herein should first be discussed. "Figure" is meant to have "shape" and "color" and used in the normal sense of the word, whereas "configuration" is a concept representing a pattern removed of color and means "shape" defining a contour of the "figure". In the present invention, "figure" is disassembled into several "normalized figures", and picture element series data formed in respect of such "normalized figures" are assembled to obtain the picture element series data for the original "figure". The term "normalization" used herein means to disassemble the "figure" into several "partial figures" each having a contour which intersects one scanning line at not more than 2 points, and a partial figure thus obtained in a "normalized figure". The partial figure has a "normalized configuration" which is a unit for processings in the present invention as will be described later.

Figure 1:
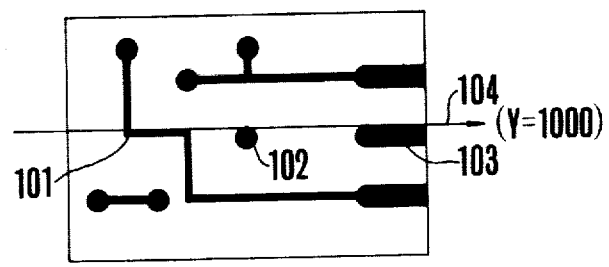
FIG. 1 is a diagrammatic representation showing a typical pattern to be processed in accordance with the invention.

FIG. 1 shows a master for a printed wiring board as a typical example of a figure group to be drawn by using picture element series data formed by a system for forming picture element series data according to the present invention. Three figures 101, 102 and 103 are shown in the figure which are selected to simplify explanation of the process of forming the picture element series data according to the present invention.

In the process of formation of picture element series data according to the present invention, formation of the cross point data which is generally classified into two modes plays an important role, and thus a description thereof will first be given.

Figure 2A:
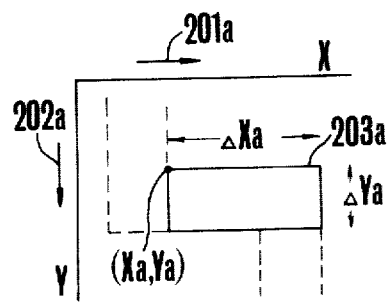
FIGS. 2A and 2B are diagrammatic representations useful in explaining formation of picture element series data or normalized patterns.

The first mode is a computing mode. FIG. 2A is a diagram to explain the computing mode wherein arrows 201a and 202a indicate primary and auxiliary directions of scanning, respectively denoted by "X" and "Y", in Cartesian coordinates. FIG. 2A shows a part of the contour of the figure 101 in FIG. 1. By taking a rectangular portion 203a indicated by a solid line as a configuration, the computing mode will be detailed. It will be easily understood that the rectangular configuration 203a is defined by coordinates $(X_a, Y_a)$ of a point where the raster crosses the configuration first and by increments $\Delta X_a, \Delta Y_a$ from this point. As the picture element series data formation proceeds to the point where the picture element series data for $Y_a$-th scanning line is to be formed, this scanning line crosses the rectangular configuration 203a and it becomes necessary to obtain a cross point data. Assuming that the cross point data are $X_s$ and $X_E$ (provided $X_s \leq X_E$), it holds that $X_s = X_a$, and $X_E = X_a + \Delta X_a$. Thus, the cross point data formation continues until the picture element series data is formed for $(Y_a + \Delta Y_a - 1)$-th scanning line. The mode in which the cross point data is formed by computing only the contour control data defining the configuration (in this case, $X_a, Y_a, \Delta X_a, \Delta Y_a$) is called the computation operation mode. In order to form the cross point data for the rectangular configuration 203a shown in FIG. 2, it is also necessary to provide data which indicates that this is a rectangular configuration to be processed by the computation data (hereinafter referred to as mode data) in addition to the aforementioned data $X_a, Y_a, \Delta X_a$ and $\Delta Y_a$. Assuming that the mode data thus provided is $O_R$, a set of data $(O_R, X_a, Y_a, \Delta X_a, \Delta Y_a)$ is called configuration describing data (hereinafter abbreviated as CDD) for the rectangular configuration 203a.

Figure 2B:
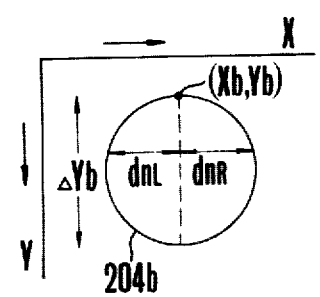

The second mode is a retrieval mode which is used in dealing with a prescribed configuration. FIG. 2B is a diagram to explain the retrieval mode wherein a circular configuration 204B is a configuration on which the figure 102 in FIG. 1 is based. As in the case of the computation mode, when coordinates at a point where the raster first crosses the circular configuration 204b are plotted $(X_b, Y_b)$, the cross point data formation begins in respect of the circular configuration from the point when the formation of picture element series data for $Y_b$-th ($y_b = Y_a$ as far as FIG. 1 is concerned) scanning line starts. When the radius for the circular configuration 204b is given in addition to $X_b$, $Y_b$ the circular configuration is defined and the cross point data is obtainable by computation. The computation in this case becomes much more complex compared to that for the rectangular configuration 203a discussed above, and encounters difficulties in the electric circuits and the computation time required therefor. In order to avoid such difficulties, there is provided a memory to store registered configuration data indicating length of segments by which the scanning lines intersect the contour of the circular configuration 204b from a certain address (expressed as storage start address T), the cross point data for $(Y_b + n)$-th scanning line, for example, is sought by reading out dnL, dnR from $(T + n)$ address (in this case $dnL = dn_R$ because of the circular configuration) to determined $X_s = X_b - dnL$, and $X_E = X_b + dn_R$. This method is particularly effective for the instances where geometrically congruent configurations appear frequently as it stores the registered configuration data in respect of such configurations. Thus, the mode in which the registered configuration data is used to seek the cross point data is called the retrieval mode. When the mode data is termed R, the CDD for the circular configuration includes R, $X_b, Y_b, \Delta Y_b$ and T. The mode data in the retrieval mode is the same irrespective of type of the configurations.

Figures 2C, 2D, 2E:
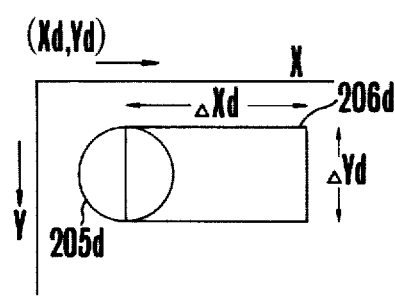
FIG. 2C shows a format of registered pattern data storage.
FIG. 2D is a diagrammatic representation useful in explaining formation of picture element series data of a composite pattern of normalized patterns.
FIG. 2E shows a format of configuration description data storage.

There are instances where both the computation mode and the retrieval mode described above may conveniently be used to seek the cross point data for one figure as shown in FIG. 2D. In this figure, there are shown two configurations to create the figure 103 of FIG. 1, namely a circular configuration 205d and a rectangular configuration 206d. The retrieval mode is used for the circular configuration 205d while the computation mode is used for the rectangular configuration 206d in order to form the cross point data, and they are assembled, partly overlapped, in the course of the picture element series data formation to obtain the picture element series data for the figure 103 of FIG. 1. Formation of the picture element series data will be discussed later, but it is apparent that when the computation mode and the retrieval mode are suitably used, the cross point data are efficiently formed.

It is to be understood that the master of the printed wiring board as exemplified in FIG. 1 is merely illustrated as a typical example and that there are various other figures conceivable and accordingly various other configurations which are used to form such other figures are also conceivable. Since it complicates the explanation of the fundamental concept of the present invention to go into details of the formation process of the cross point data in respect of every conceivable figure, description is limited only to the typical configurations of rectangle and circle. In practice, a rectangular configuration which is not in parallel to the scanning direction is rather often encountered and the process of forming the cross point data in such a case will be explained later referring to a subsequent embodiment of the present invention.

The foregoing description teaches the necessity of formation of the CDD groups for respective scanning lines from the contour control data in order to form the picture element series data by the system of the present invention. It will also be understood that respective CDD groups be arranged in the order of generation of the scanning lines in the auxiliary direction of scanning, or that a value of Y at a point where the raster first crosses the configuration be used as the key to sort out the data. Preparing CDD groups and sorting operation are not detailed here since they may be realized by software for ordinary universal computers.

FIG. 2E shows an example of CDD group stored in the order of generation in respect of one scanning line based on configurations used heretofore in description. Four of the configurations 203a, 204b, 205d, and 206d are supposed to cross the same scanning line for instance the 1,000th scanning line, for the first time. This means that all the values of Ya, Yb and Yd are equal. Then, arrow 104 in FIG. 1 is representative of the 1,000th scanning line. The CDD group of the four configurations starting from the 1,000th scanning line and the manner in which they are stored are as shown in FIG. 2E. As shown in the figure, the storage is assumed to have started from an address M. At the address M is stored a data or value "1,000" which indicates that the CDD group starting from the 1,000th scanning line is stored. Subsequently, another data of the CDD group is sequentially stored at the next M+1 address onward. It is to be noted that the form of CDD shown in the foregoing description of the two modes upon formation of the cross point data and that of FIG. 2E are slightly different. in FIG. 2E showing the manner in which data of CDD group are stored, the Y value of 1,000 representative of the position where the raster first crosses the configuration is used as a sorting key which is stored in the beginning as a common value (to be referred hereinafter as the formation start position data), and is not included in the individual CDD groups. In this example, the radius of the two circular configurations 204b and 205d is assumed to be equal, or they are deemed congruent geometrically, so that the same storage start address T is stored at addresses M+7 and M+11. At the addresses M+17 to M+20 are stored pseudo CDD, which indicates the end of CDD group related to a certain scanning line. Since $\Delta Y_a$ at address M+4, $\Delta Y_b$ at M+8, $\Delta Y_d$ at M+12, and $\Delta Y_d$ at M+16 are the data to represent extension of the figure in the auxiliary direction of scanning, they are related not only to the associated scanning line but also to the ensuing scanning lines (1,000st line, 1,002nd line, ... in this example), and these data are used for judging "Continuation" which will be described later but in brevity, $\Delta Y_a$ (address M+4), for example, is used to judge whether or not the data $O_R$ (address M+1), (M+2) and $\Delta X_a$ (M+3) concerning the 1,000th scanning line are necessary for the 1,001st line, 1,002nd line and so on.

In addition to the description given of the CDD group, it is necessary to explain two memory units for storing such FDD groups and the control therefor. The CDD groups stored in the manner shown in FIG. 2E are sequentially read out for starting processing from the one in which the order of the scanning line in the auxiliary direction of scanning coincides with the data for the formation start position data. It is axiomatic that a memory for storage of all the CDD groups which is controlled for sequential read out of these CDD groups is needed, which memory is called a first CDD memory unit (hereinafter referred to as a fresh CDD memory unit for simplicity of explanation).

Usually, one configuration continuously crosses over and ensuing several scanning lines. This means that the FDD read out from the fresh CDD memory unit is continuously processed at several successive scanning lines. Therefore, it becomes necessary to gradually change CDD as will be referred later and re-store them several times along with several data in order to shorten the processing time.

For this reason, it is preferred from the practical point of view to provide a second CDD memory unit which stores CDD being processed continuously (hereinafter referred to as a continuous CDD memory unit). The present invention employs such a memory unit. It is noted here that it is sufficient for the continuous CDD memory unit to have a capacity far smaller than that of the fresh CDD memory unit.

FIGS. 3A to 3H show the manner in which CDD groups are stored and controlled at the continuous CDD memory unit in corporation with the fresh CDD memory unit.

Figures 3A, 3B, 3C, 3D, 3E, 3F, 3G, 3H:
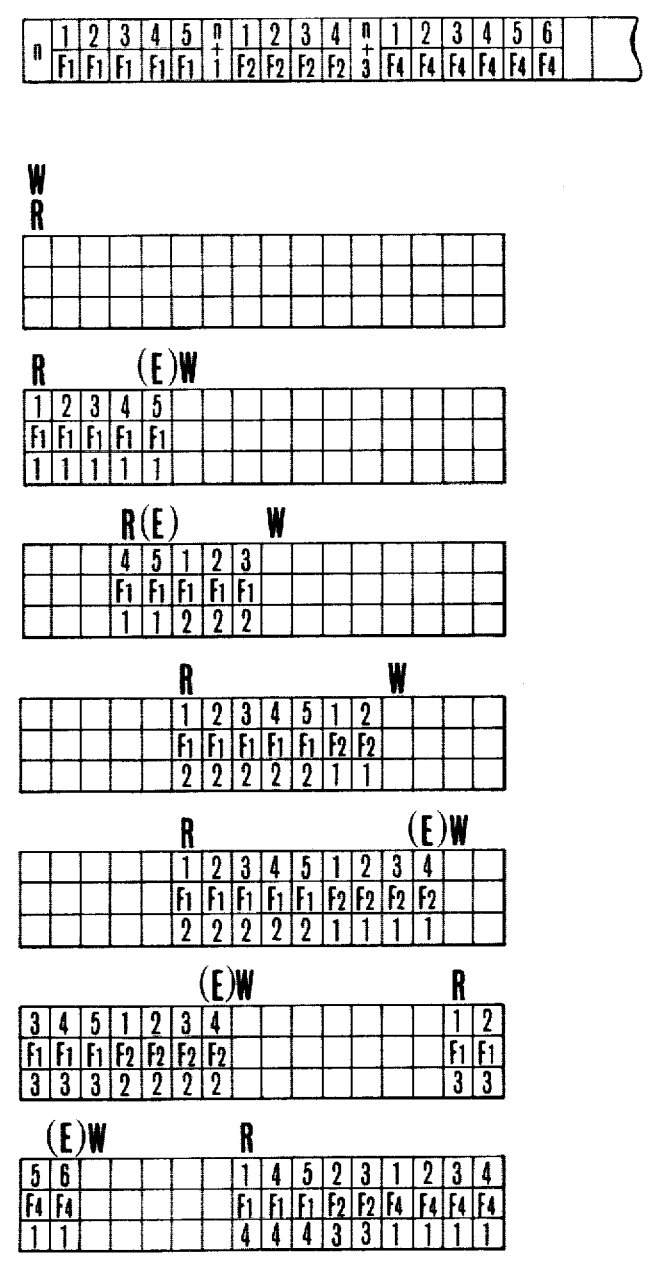

FIG. 3A shows in a simple form an example of CDD groups stored in the fresh CDD memory unit and associated with the n-th (wherein n is an integer) scanning line, and indicates that there are five CDDs, $1F_1$, $2F_1$, $3F_1$, $4F_1$ and $5F_1$ starting from this scanning line, and that there are four CDDs starting from the (n+1)-th scanning line, and also that there is zero CDD for the (n+2)-th scanning line and six for the (n+3)-th scanning line. Description is now made of the data shown in FIG. 2E in comparison with CDD group shown in FIG. 3A; the data n for the formation start position, the first CDD group $1F_1$, the second CDD group $2F_1$, the third CDD group $3F_1$, the fourth CDD group $4F_1$, and the fifth CDD group $5F_1$ associated with n-th scanning line respectively correspond to 1,000, OR to $\Delta Y_a$ (addresses M+1 to M+4), R to $\Delta Y_b$ (addresses M+5 to M+8), R to $\Delta Y_d$ (addresses M+9 to M+12), OR to $\Delta Y_d$ (addresses M+13 to M+16) and pseudo CDD "E", "-", "-", "-", (addresses M+17 to M+20). Pseudo CDD is not shown in FIG. 3A.

FIG. 3B shows the state of the continuous CDD memory unit before the picture element series data formation is started, wherein R and W are symbols to indicate the read-out position and the write-in position for this memory unit. At this point, CDD to be stored in the continuous CDD memory unit naturally does not exist.

When the formation of the picture element series data is started, CDD read-out begins. As it is preferable from the point of control to read out CDD stored in the continuous CDD memory unit prior to reading out CDD stored in the fresh CDD memory unit, the present invention follows this order for reading out.

With the start of the formation process for the picture element series data for n-th scanning line, read out of CDD stored at the continuous CDD memory unit is started. With the just mentioned case, there exists no such CDD, and CDD read out from the fresh CDD memory unit is started immediately. As shown in FIG. 4, five CDDs of the new $F_1$ group associated with the n-th scanning line is successively read out from the fresh CDD memory unit and used for formation of the cross point data. If these CDDs are judged to be processed in the next scanning line in a manner as will be described later, they are somewhat modified or added with new data as desired, and stored in the continuous CDD memory unit as the 1st continuous $F_1$ group. The contents on the third line in the continuous CDD memory unit shown in FIG. 3C schematically show such modifications and addition of data, and as an example shows the frequency of the processing which has been completed. FIG. 3C shows the above mentioned five CDDs all judged to be processed in the (n+1)-th scanning line and stored in the continuous CDD memory unit. In FIG. 3C, (E) denotes an end mark indicating the read-out termination position for the continuous CDD memory unit. It should be noted that CDDs stored in the continuous CDD memory unit are all to be processed continuously in the next scanning line so that the formation start position data is not essentially needed for them. Thus, there exists no formation start position data among the CDD groups stored in the continuous CDD memory unit.

In connection with the formation process for the picture element series data in respect of (n+1)-th scanning line, the CDD within the continuous CDD memory unit shown in FIG. 3C is sequentially read out and processed to give the 1st continuous $F_1$ group (see FIG. 4). FIG. 3D shows a transient state wherein three CDDs have already been processed and $1F_12$, $2F_12$ and $3F_12$ are added as new data following not-processed data associated with the subject scanning line and further these are judged to be processed in the (n+2)-th scanning line to give the second continuous $F_1$ group and stored in the continuous CDD memory unit again. When processing of five CDDs concerning the second continuous $F_1$ group within the continuous CDD memory unit has been completed, four CDDs in the fresh CDD memory unit which start with the (n+1)-th scanning line and give new $F_2$ group are sequentially read out and processed. FIG. 3E shows a transient state in such a sequence. It should be noted that the end mark (E) disappears in the process where CDD inside the new CDD memory unit is being processed. FIG. 3F shows the state of the continuous CDD memory unit when the picture element series data formation in respect of (n+1)-th scanning line is completed.

FIG. 3G shows a state of the continuous CDD memory unit at the point when the picture element series data formation in respect of (n+2)-th scanning line has been completed, and it is considered advisable to discuss two points in particular at this time. The first point concerns that the present invention uses a cyclic control applied to the continuous CDD memory unit as is clear from FIG. 3G. It will be easily understood that this improves the utilization efficiency for the continuous CDD memory unit. The second point concerns that the CDD group having a formation start position data of "n+2" does not exist in the fresh CDD memory unit, and therefore only the second continuous $F_1$ group and the first continuous $F_2$ group are given in the formation process of the picture element series data for the (n+2)-th scanning line, and that there occurs no CDD read out from the fresh CDD memory unit and processing for CDD.

FIG. 3H shows the state of the continuous CDD memory unit at the time the picture element series data formation has been completed which was carried out to give the third continuous $F_1$ group, the second continuous $F_2$ group and the new $F_4$ group in respect of the (n+3)-th scanning line. Attention be made to disappearance of CDD in this phase. In other word, although several of CDDs within the continuous FDD memory unit have been processed in the formation process of the picture element series data for (n+3)-th scanning line, they are judged not to be processed continuously at the next (n+4)-th scanning line and have disappeared. As is clear from FIG. 3H, they are $2F_1$ and $3F_1$ starting with n-th scanning line, and $1F_2$ and $4F_2$ starting with (n+1)-th scanning line. As for the (n+4)-th scanning line, the fourth part continuous $F_1$ group, the third part continuous $F_2$ group, and the 1st continuous $F_4$ group are given.

FIG. 5 is a block diagram showing one example of structure for the picture element series data formation system according to the present invention. The CDD read out from a fresh CDD memory unit 501 or a continuous CDD memory unit 502 is sent to a cross point data formation unit 503. The cross point data formation unit 503 forms a cross point data referring to a registered configuration data stored at a memory unit 504 as desired, and sends them to a picture element series data formation unit 505. This unit 505 stores the picture element series data at a position of a picture element series data memory unit 506, which position is designated by the cross point data. A supply unit 507 supplies the picture element series data to the next processing unit 510 after the picture element series data in respect of one scanning line has been formed at the picture element series data memory unit. A continuation judgement unit 508 receives a part of CDD, judges whether or not the CDD is to be continuously processed in the next scanning line; if judged yes, it causes CDD retained in the cross point data formation unit 503 to be stored in the continuous CDD memory unit 502 via a signal line 503a. A memory control unit 509 controls the fresh FDD memory unit 501 and the continuous CDD memory unit 502 such that they operate in the manner above explained.

Figure 6:
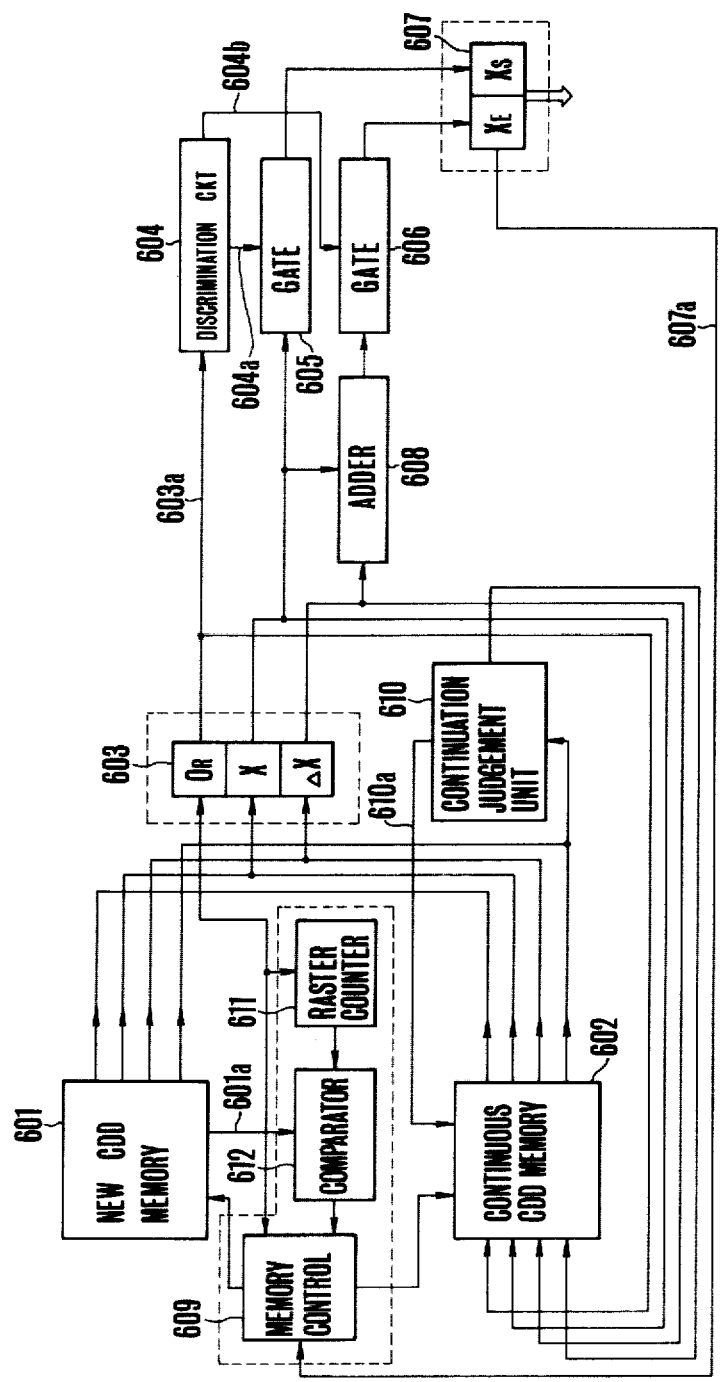
FIGS. 6 and 7 are block diagrams showing details of FIG. 5.

FIG. 6 is a block diagram showing an example of the process for forming the cross point data from the rectangular configuration CDD by the operation mode, and is shown to explain the detailed construction of the fresh or new CDD memory unit, the continuous CDD memory unit, the cross point data forming unit, the continuation judgement unit and the memory control unit, and their interrelations and operations. When the rectangular configuration CDD, or mode data $O_R$, X and X are read out from either of a new CDD memory unit 601 or a continuous CDD memory unit 602, for instance from the latter, then these data are held at an CDD register 603 in the cross point data formation unit. Reference will be made later to Y. The $O_R$ is sent to a discrimination circuit 604 via a signal line 603a and when it is decided that processing for the rectangular configuration CDD by the computation mode is needed, signals are generated at signal lines 604a and 604b to enable gate circuits 605 and 606, respectively. Supposing that the value of X is 200, this value passes through the gate circuit 605, enters a cross point data register 607, thereby setting $X_s$ at 200. The value is also fed to one of inputs of an adder circuit 608. The other input of the adder circuit 608 receives $\Delta X$. Supposing that the value of $\Delta X$ is 1000, the output of the adder circuit 608 is 1000+200=1200, which in turn is led to the cross point data register 607 through the gate circuit 606 to thereby set $X_E$ at 1200, thus forming one cross point data along with the aforementioned $X_s$. When one cross point data is formed, a signal is sent to a read-out and storage control circuit in the memory control unit (hereinafter referred to as R-W control circuit) 609 via a signal line 607a, and read-out for the next CDD is started. On the other hand, $\Delta Y$ from the new CDD memory unit 601 is sent to a continuation judgement unit 610. Assuming that $\Delta Y$ is 5, the continuation judgement unit substracts 1 from the value of $\Delta Y$ to obtain 4, and compares it with 0 (zero). As 4 is greater than 0, it is judged that the CDD held at the CDD register 603 is to be processed continuously in the next scanning line. Then, a signal is sent to the continuous CDD memory unit 602 via a signal line 610a to cause CDD held at the CDD register 603 and the continuation judgement unit 610 to be stored in the unit 602. Obviously, the CDD to be stored includes OR, 200, 1000 and 4. A raster counter 611 and a comparator circuit 612 are both included in the memory control unit. At the raster counter 611 is held a value to indicate that the picture element series data is being formed in respect of which scanning line. The comparator circuit 612 compares the formation start position data sent via a signal line 610a with the output of the raster counter 611, and transmits a signal to the R-W control circuit 609 if the two are equal to cause the read out of CDD from the new CDD memory unit 601 to start.

Figure 7:
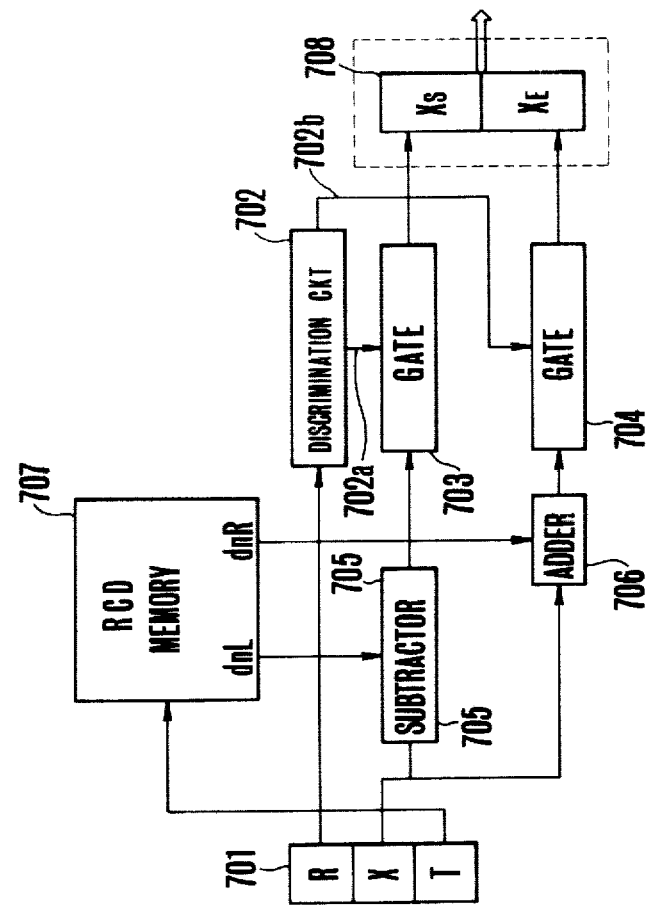

FIG. 7 is a block diagram to explain the formation process for the cross point data by the retrieval mode. A mode data R read out at a CDD register 701 (although shown as corresponding to the register 603 in FIG. 6, a separate register may be provided) is sent to a discriminating circuit 702 where it is judged to be for processing by the retrieval mode. Then, signals are generated at the signal lines 702a, 702b to enable gate circuits 703 and 704. Assuming that X is 1000, it is introduced to one of inputs of a subtractor circuit 705 and an adder circuit 706. Symbol T denotes a read-out address at a registered configuration data memory unit 707. Assuming that T is 100 and dnL=500 and dnR=300 are stored at the address 100 of the registered configuration data memory member 607, these values are read and fed to the other input of the subtractor circuit 705 and the adder circuit 706, respectively. The output of the subtractor circuit 705 is 1000−500=500, and that of the adder circuit 706 is 1000+300=1300, which values are then introduced to a cross point data register 708 via the gate circuits 703 and 704 to form a cross point data. It will be understood that although the same steps for judging the continuation as in the case of the operation mode are carried out, when storing CDD processed by the retrieval mode in the continuous CDD memory unit, 1 is added to T, so that in this instance 100+1=101 takes place.

As for the picture element series data formation unit wherein the picture element series data is stored based on the cross point data formed at the cross point data formation unit, it is easily realized using the technology disclosed, for instance in Japanese Patent Application No. 52-135512 entitled "Dot Pattern Generating Circuit". Therefore, no detailed discussion will be given here.

By providing a buffer memory means in the foregoing embodiment of the picture element series data formation system according to the present invention, a speed processing can advantageously be realized. For instance, memory regions for two scanning lines may be provided in the picture element series data memory unit and used to simultaneously conduct the formation of the picture element series data and the supply thereof to the subsequent processing unit.

In the embodiment explained heretofore, the concept for this invention is embodied based on the instance where comparatively simple master is drawn as shown by the reference numerals 101, 102 and 103. A second embodiment offers a construction for forming picture element series data concerning a more complicated figure.

FIG. 8 shows one example of such a complex figure. Figure 801 is one actually used as a master of air inner lay conductive type 1 and for a printed wiring board. Although it is a figure actually used, it will be easily seen that it is not a normalized figure. Now consider a method of disassembling the figure 801 for normalization when forming the picture element series data for the raster with the figure 801. It will be reasonable to break down the figure into four figures of 901, 902, 903 and 904 as shown in FIG. 9. Supposing that the scanning lines move in the directions indicated by arrows 905 and 906, then the figures 901 and 902 are not normalized. In other words, the configuration of the figures 901 and 902 are such that they cross the scanning lines at four points. Then, the figures 901 and 902 may be divided into two sections, for instance along dotted lines 907 and 908, to complete the normalization of the figures.

However, thus normalized figures are quite different from the commonly occurring figures of circle or rectangle, and their handling is quite complicated.

FIG. 10 shows the method of disassembling and the order of compiling for normalized figure when forming the picture element series data for drawing the figure 801 in FIG. 8. The figures 1001, 1002, 1003-1, 1003-2 and 1004 are all normalized. In figures 1002, 1003-1, 1003-2 and 1004, $d_1$, $d_2$ and $D_1$ have the same dimensions as their corresponding parts of FIG. 8. Assuming that either the figure 1002 or the figure 1004 is placed over the hatched portion of the figure 1001, and the hatched area of the figure 1001 is to be erased by the area corresponding to the area enclosed by the contour in the figure 1002, or 1004, these figures may be "overlapped" in this order to obtain the figure 801 shown in FIG. 8. In this case the order of overlapping the figure 1002 with those of 1003-1 and 1003-2 are reversible, and each of these figures may also be treated as one normalized figure.

Although the detailed reference will be made later, it is pointed out that overlapping of the figures as discussed here means overlapping of the figures in terms of electric signals, and as is clear from the foregoing description, the important thing in the formation of the picture element series data in the present embodiment is the order in which they are overlapped as well as the configuration and the tone of the normalized figures.

In this embodiment, EDD corresponds to CDD of the first embodiment. The reason why the two are distinguished is that the former contains the tone data. Since the amount of tone data is rather limited in practice, however, it is possible to store it in the same place as in the mode data in the case of CDD. Therefore, FDD may be considered entirely identical in form with CDD even if the tone data is included. Storage of FDD in the memory unit is also substantially the same as that for CDD, and therefore is not detailed.

Figure 11:
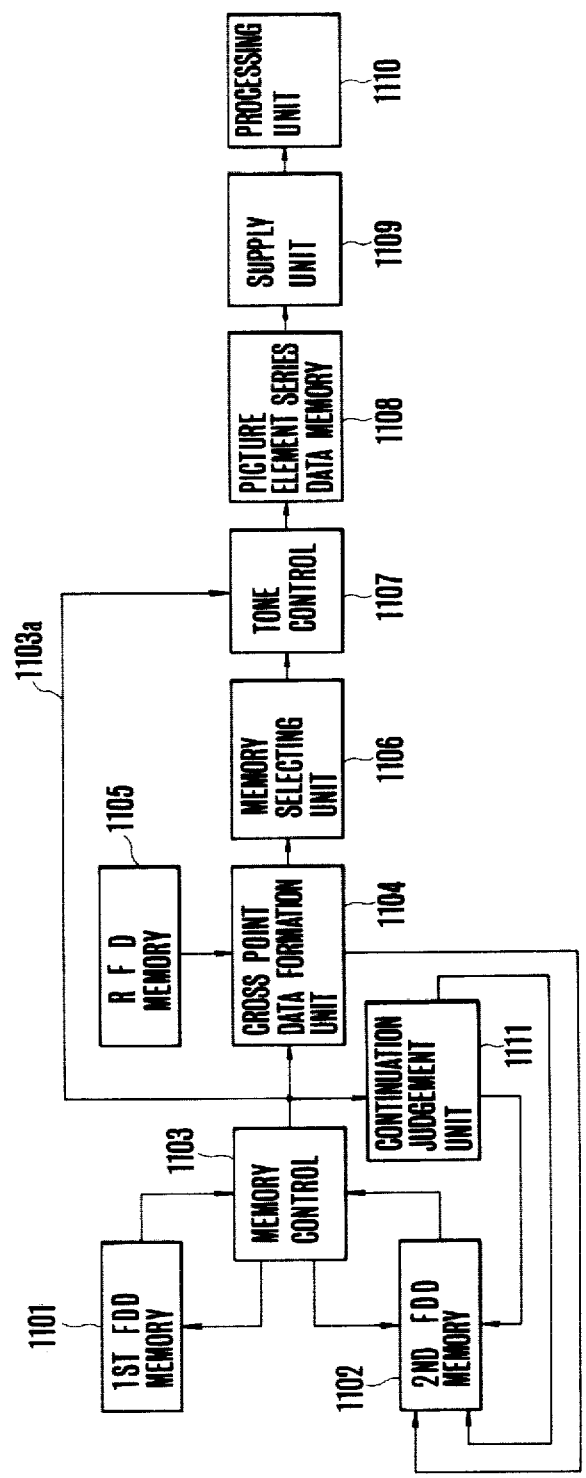
FIG. 11 is a block diagram of another embodiment of the invention.

FIG. 11 shows a construction of the picture element series data formation system according to the present second embodiment. The FDD read out from either one of a first FDD memory unit 1101 or a second FDD memory unit 1102 is transmitted to a cross point data formation unit 1104 via a memory control unit 1103. As described with reference to the first embodiment, there is formed a cross point data from FDD by the operation mode or the retrieval mode at the cross point data formation unit 1104. As the complex figures as mentioned in the embodiment are often processed by the retrieval mode, explanation is given of the formation process of the cross point data by the retrieval mode by taking the example of the figure 1001 shown in FIG. 10. As explained before with reference to FIGS. 2B and 2C, arrows 1005 and 1006 indicate the primary and auxiliary directions X and Y of scanning. In this case, FDD for the figure 1001 includes R, $X_a$, $(Y_a)$, $\Delta Y$, and T with R indicating the mode data wherein the FDD is to be processed by the retrieval mode. As the picture element series data formation proceeds into the formation process of the picture element series data for $Y_a$-th scanning line, FDD is read out from the first FDD memory unit 1101 to the cross point data forming unit 1104. At the cross point data forming unit 1104, a registered configuration data RFD is read out from a (T+n) address of the RFD memory unit 1105 according to the mode data R. (See FIG. 2C). When these are termed dnL and dnR, the cross point data are formed to establish $X_s = X_a - dnL$ and $X_E = X_a + dnR$. Thus obtained cross point data are then transmitted to a memory selecting unit 1106, which emits signals to select the memory elements corresponding to the picture elements positioned between the two cross points of the cross point data from a picture element series data memory unit 1108. Such a memory selecting unit 1006 may be realized using the technology disclosed, for example, in Japanese Patent Application 52-135512 entitled "Dot Pattern Generating Circuit" as set forth hereinbefore. A tone control unit 1107 controls the memory elements of the picture element series data memory unit selected by the memory selecting unit 1106 to store the tone data supplied via a signal line 1103$_a$. "Overlapping" of figures in terms of electric signals mentioned before is the total function incorporating various functions of the memory selecting unit 1106, the tone controlling unit 1107, and the picture element series data memory unit 1108. After the picture element series data in respect of one scanning line has been formed at the picture element series data memory unit 1108, a supply unit 1109 supplies the same to the following processing unit 1110. A continuation judging unit 1111 judges whether or not the following scanning line crosses the configuration, and having judged yes, processes the FDD for continuation, and causes the same to be stored in the second FDD memory unit 1102.

As for example of the aforementioned FDD, 1 is subtracted from $\Delta Y$, and when the result is greater than 0, a new FDD including R, $X_a$ $\Delta Y - 1$, and $T + 1$ is stored in the second memory unit 1102. As shown in the first embodiment, $Y_a$ is used as a sorting key and therefore does not appear in FDD.

FIGS. 12A to 12E are diagrams to explain the "overlapping" of figures in terms of electric signals taking an example of the picture element series data related to the scanning line 802 of the figure 801 shown in FIG. 8. The arrows 1107, 1008, 1009 and 1010 shown in FIG. 10 indicate the scanning line identified by the arrow 802 in FIG. 8, being placed over the normalized patterns 1001, 1002, 1003-1 and 1004, respectively. FIGS. 12A, 12B, 12C, 12D and 12E diagramatically show portions of the picture element series data memory unit, wherein "1" represents black and "0" represents white. FIG. 12A is a state before the picture element series data formation begins and therefore all are "0" or white. FIGS. 12B to 12E respectively show the state where the picture element series data respectively are formed at the position of the scanning line 802 of the normalized figures 1001, 1002, 1003-1 and 1003-2, 1004. The last of the figures, FIG. 12E, shows the picture element series data at the position of the scanning line 802 of the figure 801.

As will be clear from the foregoing description, the overlapping of the figures in terms of the electric signals used herein is the operation wherein while using the signals from the memory selecting unit as a mask signal, the tone data is stored in the picture element series data memory unit in the predetermined order. This operation is easily conducted using an ordinary multiplexer circuit, etc. and therefore no detailed description is given. Use of the picture element series data formation system according to the present embodiment will facilitate treatment of a complex figure and efficient formation of the picture element series data.

Heretofore, the concept of the picture element series data formation system according to the present invention and the treatment of comparatively complex figures which included arcuate portions have been discussed with reference to the first and the second embodiments. With the third embodiment to be described below, it is possible to efficiently form the picture element series data for drawing the figures usually occurring in master figures for the printed broad wiring. The discussion is now made to the "figures usually occurring in master figures for the printed wiring board". The master figure for the printed board wiring prepared using the so-called photo-probe plotter comprises a figure formed as the aperture attached to the photohead of such a device moves between the two points "linearly", and means "The figure usually occurring in the master figure for the printed wiring board" as mentioned in the present embodiment.

The expression that apertures "move linearly between the two points" includes an instance where the two points are identical and in this instance various shapes of apertures are used. On the other hand the aperture moving between the two different points is usually circular in shape. Therefore, the description given below will discuss an example of a figure formed as the circular shaped aperture moves linearly between the two different points.

Figure 13A:
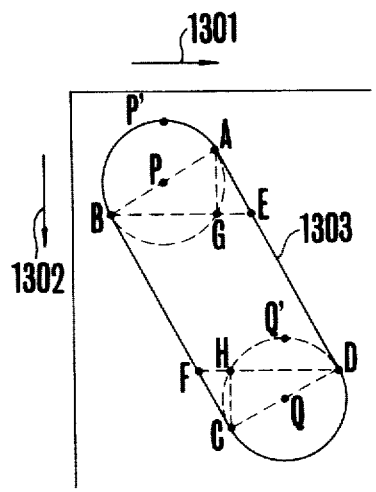
FIGS. 13A and 13B show the manner of normalization of general patterns.
Figure 13B:
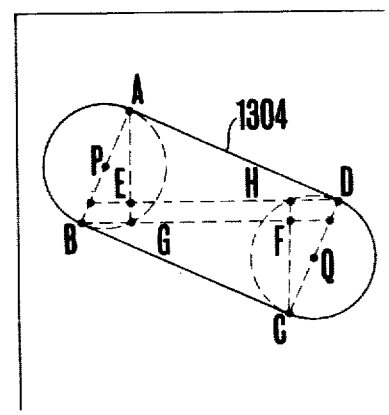

FIGS. 13A and 13B are the drawings to explain the configurations of general figures formed as the circular aperture move between two different points linearly. Arrows 1301 and 1302 in the figures show, as in the embodiments described before, the primary direction X and auxiliary direction Y of scanning. When the two different points are denoted as P and Q, in view of the relative positions of P and Q, it is preferable to consider the configuration of the general figure formed by the linear movement of the circular aperture between the two points in terms of the two instances as shown in FIGS. 13A and 13B. Supposing that coordinates at P and Q are respectively ($P_x$, $P_y$) and ($Q_x$, $Q_y$), $\Delta X = |P_x - Q_x|$, $\Delta Y = |P_y - Q_y|$, and the radius of the circular configuration is R, it will be easily confirmed that FIG. 13A corresponds to a case where the relation of $\Delta Y/\Delta X \geq 2R/\sqrt{(\Delta X)^2 \times (\Delta Y)^2}$ establishes between $\Delta X$, $\Delta Y$, and R, whereas FIG. 13B corresponds to a case where $\Delta Y/\Delta X < 2R/\sqrt{(\Delta X)^2 + (\Delta Y)^2}$ stands.

It is clear that the configuration 1303 of FIG. 13A is normalized with two circular configurations, one parallelogram BFDE, and two right angle triangles AEG and CFH (right angle triangles ABG and CDH are included in the circular configurations). Similarly, the configuration 1304 in FIG. 13B is normalized with two circular configurations, one rectangle EGFH, and two right angle triangles ADE and CBF. When the line connecting the point P and the point Q is parallel to the primary or auxiliary direction of scanning (practically most figures are included in this category), it will be easily understood that the configuration of a figure to be drawn is normalized with two circular configurations and one rectangular configuration having the sides parallel to the primary or auxiliary direction of scanning as described in detail with reference to the first embodiment.

Since the rectangular configuration may be considered one special form of parallelogram and therefore the former may be included in the latter, then the normalized configuration obtained from the figures formed as the circular aperture moves between the two points linearly includes either one of the circular configurations which is the figure of the aperture, the parallelogram having a set of opposite sides parallel to the primary direction of scanning, and the right angle triangle having two sides subtending right angles which are parallel to either the primary or auxiliary direction of scanning. In the case where the two points are identical point, the aperture is not necessarily circular and various normalized figures appear although the number of their types is limited. These are called registered figures inclusively and represented by a circular configuration in the discussion to follow. The configuration of a figure formed when the aperture having configurations other than a circle moves between the two different points linearly may finally be normalized into the three types of normalized figures, although details will not be given.

The process of forming the cross point data from the normalized configuration is also important in forming the picture element series data from the present embodiment as was in the previously discussed embodiments. The emphasis therefore will be placed on the process of forming the cross point data from the above mentioned three normalized configurations in the description to follow.

Figure 14A:
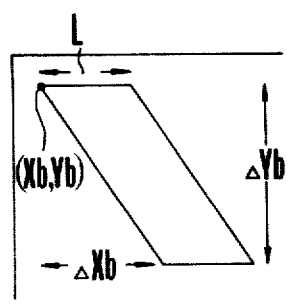
FIGS. 14A and 14B are diagrammatic representations of normalized configurations for the patterns in FIGS. 13A and 13B.
Figure 14B:
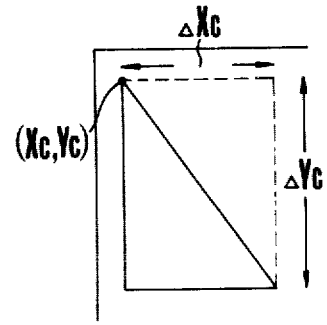

Of the three types of normalized configurations, the registered configuration is processed by the retrieval mode, and the parallelogram and the right angle triangles by the computing mode. The circular configuration is a registered configuration and processed in the same way as in the previously described embodiments. Therefore, the explanation thereof is omitted. The parallelogram CDD in FIG. 14A comprises six data of $O_p$, $X_b$, $Y_b \Delta X_b$, $\Delta Y_b$ and L. The $O_p$ is naturally the mode data for this parallelogram. The right angle triangle CDD in FIG. 14B comprises five data of $O_t$, $X_c$, $Y_c \Delta X_c$ and $\Delta Y_c$. As shown in the drawing, two right angle triangles shown by the solid lines and the broken lines are conceivable either one of which may be selected practically in accordance with a parameter added in the $O_t$.

FIG. 15 takes as an example the configuration shown in FIG. 13A, and illustrates assembling of the normalized configurations and corresponding CDDs. The configuration 1303 in FIG. 13A is normalized with five normalized configurations of 1501, 1502, 1503, 1504 and 1505 shown at (1), (2), (3), (4) and (5) in FIG. 15, and it will be confirmed easily that by assembling these five normalized configurations, the original configuration 1303 is obtainable. The CDD of the above-mentioned normalized configurations are respectively shown at (1)', (2)', (3)', (4)', and (5)' in FIG. 15. Symbols L, U in the mode data for the right angle triangular configurations Ot(L), Ot(U) represent "Lower" and "Upper" respectively indicating whether the apex of the right angle is on the upper side or the lower side of the base. In this example, the relation between the Y coordinates P'y Ay, By, Q'y and Fy of the points P', A, B, Q' and F is P'y<Ay<By<Q'y<Fy. It should be noted, however, that P'y, Ay, By, Q'y and Fy are not included in the individual CDD since the CDD is sorted by using Y as a sorting key prior to information of the cross point data and therefore are aligned in the order of generation in the auxiliary direction of scanning and the increment in the auxiliary direction from Y of the sorting key alone may be included. Therefore, they are in bracket in the drawing.

Figure 16:
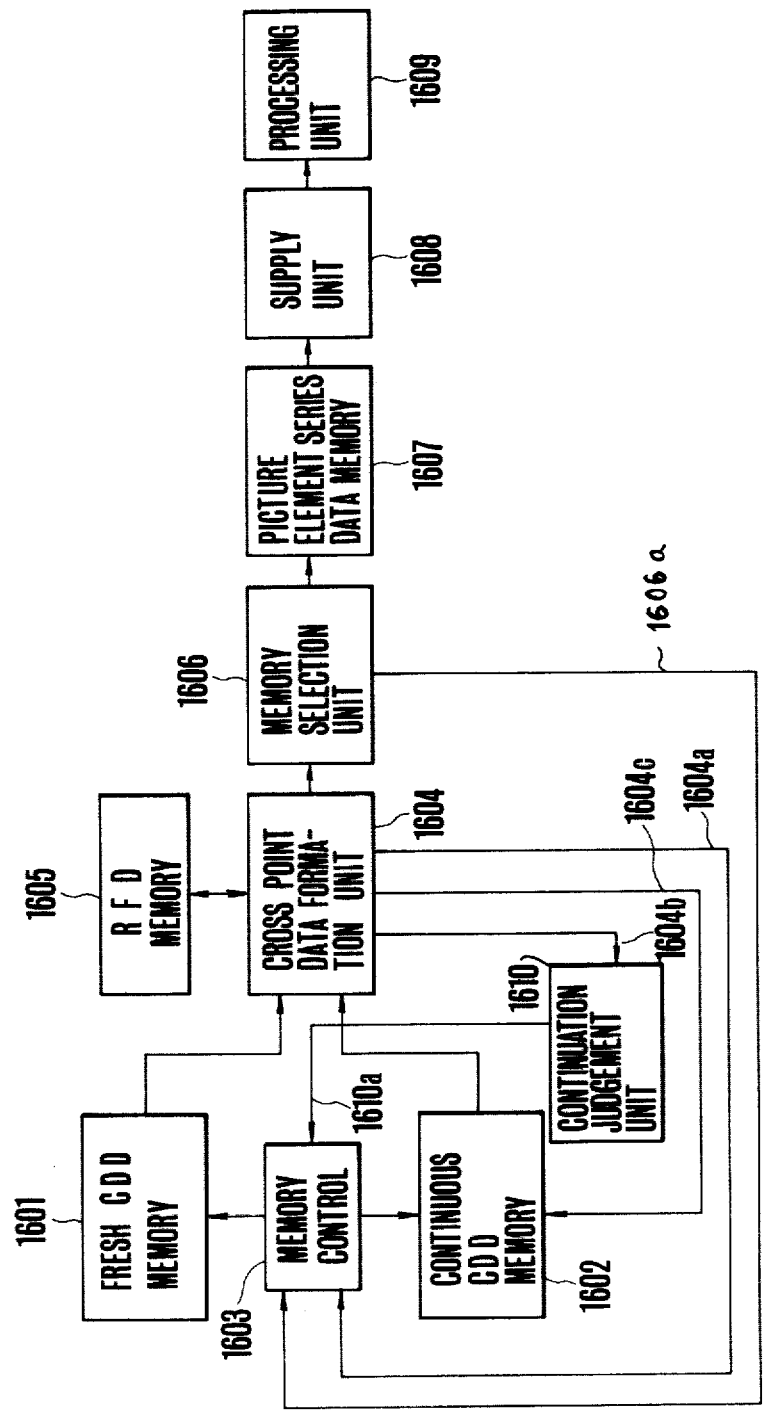
FIG. 16 is a block diagram of still another embodiment of the invention.

FIG. 16 is a block diagram to explain the arrangement of the system according to this embodiment. As in the case of the first and second embodiments, the CDD is read out from a first CDD memory unit, that is, a fresh CDD memory unit 1601, or a second CDD memory unit, that is, a continuous CDD memory unit 1602 under the control of a memory control unit 1603 and sent to a cross point data formation unit 1604. At the cross point data formation unit 1604, a cross point data is formed according to the CDD mode data by referring to RFD in an RFD memory unit 1605 in the case of the retrieval mode or by the internal operation in the case of the operation mode.

When one cross point data is formed, a signal appearing at a signal line 1604a controls the memory control unit 1603 and causes the next CDD to be read out. The memory selection unit 1606 receives the cross point data, selects memory elements corresponding to picture elements between the two cross point data from the picture element series data memory unit 1607, and causes a signal indicating that the figure exists in the memory elements to be stored. Such a memory selection unit 1606 may be realized by using the technology disclosed in, for instance, Japanese Patent Application No. 52-135512 entitled "Dot Pattern Generating Circuit".

When the picture element series data for one scanning line is formed at the picture element series data memory unit 1607, a signal appears at a signal line 1606a to cause the memory control unit 1603 to read out the CDD for the next scanning line. A supply unit 1608 supplies the picture element series data for one scanning line to the ensuing processing unit 1609 after it has been formed. A continuation judgement unit 1610 receives a value of $\Delta Y$ in the CDD from the cross point data formation unit 1604 via a signal line 1604b, deducts 1 from the $\Delta Y$ value, and compares the obtained value with 0 in order to judge whether or not the configuration represented by the CDD crosses the next, following scanning line. If it is judged to cross, or the value $\Delta Y - 1$ is greater than 0, a signal is sent to the memory control unit 1603 via a signal line 1609a to have the same stored in the CDD memory unit 1602 via a signal line 1604c.

Figure 17:
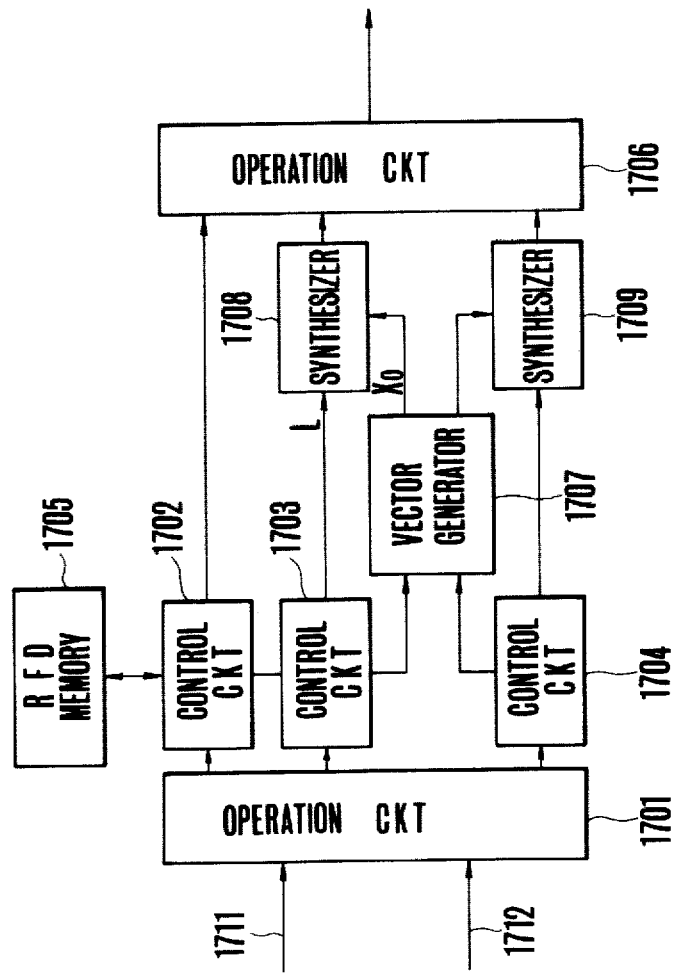
FIG. 17 is a block diagram showing details of FIG. 16.

FIG. 17 is a block diagram to explain in further detail the operation of the cross point data formation unit 1604 by taking an example of CDD for plotting the figure shown in FIG. 13A. A discriminating circuit 1701 discriminates the type of CDD supplied from the fresh and continuous CDD mode data via signal lines 1711 and 1712, and sends the CDD to control circuits 1702 to 1704 in accordance with the results obtained. The control circuit 1702 is adapted to control the formation process of the cross point data in registered form, and reads RFD, for instance, dnL and DnR, from an RFD memory unit 1705 and sends the read-out RFD along with $X_a$ of CDD to an operation circuit 1706 where the cross point data is sought by computing $X_a - dnL$ and $X_a + dnR$. The control circuits 1703 and 1704 respectively control the process for forming the cross point data for parallelogram and the right-angle triangular configurations, and a part of the CDD transmitted thereto is supplied to a vector generator circuit 1707 to seek the cross point of the hatched portions of the respective configurations and the raster. The vector generator circuit 1707 may be realized by using the technology known such as from Japanese Patent Application Laid Open No. 52-108739 entitled "Vector Generator". The output of the vector generating circuit 1707 is sent to either one of synthesizer circuits 1708 and 1709. Assuming that the output of the vector generator circuit 1707 is $X_o$, the value of $X_o$ and L are sent from the synthesizer circuit 1708 to the operation circuit 1706, thereby obtaining the cross point data of $X_o$ and $X_o + L$. Either one of $X_c$ and $X_c + \Delta X_c$ is sent from the synthesizer circuit 1709 by $X_o$ and the mode data $O_t$ to the operation circuit 1706, producing the cross point data being $X_c$ and $X_o$ in the case of $X_c$, and $X_o$ and $X_c + \Delta X_c$ in the case of $X_c = \Delta X_c$.

In the present embodiment, the rectangular configuration is deemed to be classified into the parallelogram, although it may naturally be treated separately.

It should be understood that the continuation judgement unit according to the present invention may be comprised of an ordinary subtractor and a comparator since, in the unit, 1 is subtracted from the $\Delta Y$ value in CDD and a result is compared with 0.

What is claimed is:

1. A display pattern preparing system comprising:
   a fixed pattern memory storing, as a registered configuration data, the length of a segment by which a fixed pattern of a prescribed configuration and area crosses a scanning line in the primary direction of scanning;
   an analogous pattern memory storing, as parameters, a reference position data representative of a reference point for a portion of an analogous pattern through which the analogous pattern overlaps the scanning line, said analogous pattern being defined as a pattern whose configuration is analogously variable, a distance data representative of the length of said portion of the analogous pattern, and a height data representative of a width of the analogous pattern in the auxiliary direction of scanning;
   means for reading out said data from said fixed pattern memory and said analogous pattern memory,
   means for preparing a position data for display of a pattern designated by the read-out data; and
   means for transmitting said position data to a display unit.

2. A system according to claim 1 wherein the fixed pattern stored as the registered configuration data in said fixed pattern memory is a pattern including at least partially a curve.

3. A system according to claim 1 wherein said fixed pattern memory holds the length, from beginning to end, of said segment, storing said registered configuration data continuously in respect of the auxiliary direction of scanning.

4. A system according to claim 1 wherein the parameter to be stored in the analogous pattern memory further comprises a change ratio data representative of a ratio at which said reference point changes in the auxialiary direction of scanning, at least one side of the analogous pattern is parallel to the primary direction of scanning, and the analogous pattern memory stores, as parameters, the length of the parallel side as the distance data, the beginning or the end of a portion of the side through which the side overlaps the scanning line as the reference position data, and change in the reference point undergoing in respect of each of the scanning lines as the change ratio data.

5. A system according to claim 1 wherein said position data preparing means functions to prepare the position data for a plurality of patterns, independent of each other and displayed on one scanning line, from the fixed pattern data read out from said fixed pattern memory and the analogous pattern data read out from said analogous pattern memory.

6. A system according to claim 1 wherein said position data includes information regarding the beginning and the end of a portion of a display pattern through which the display pattern overlaps the scanning line, and said position data preparing means transmits these information to the transmitting means, for preparation of a data representing the contour of the display pattern.

7. A system according to claim 1 wherein said position data preparing means prepares information regarding all the positions between the beginning and the end of a portion of a pattern through which the pattern overlaps the scanning line, and outputs the data for displaying the pattern contour and the content thereof to the transmitting means.

8. A system according to claim 1 wherein said position data preparing means computes the position where said fixed pattern is displayed on the display unit, the position where said analogous pattern is displayed on the display unit based on said parameters, thereby preparing the position data for the fixed pattern displayed on the display unit and the position data for the analogous pattern displayed on the display unit.

9. A system according to claim 1 wherein a composite pattern displayed on the display unit is disassembled into a plurality of special patterns, a first pattern of such special patterns including at least partially a curve is stored in said fixed pattern memory, a second pattern having at least one side parallel to the primary direction of scanning is stored in said analogous pattern memory, said first and second patterns being synthesized at said position data preparing means thereby to form a position data for said composite pattern.

10. A system according to claim 4 which further comprises means for changing the distance data and/or the change ratio data of said parameters, whereby said position data preparing means prepares the position data for a plurality of analogous patterns by logically operating the parameters changed by the changing means.

11. A system for forming picture element series data comprising:
   a first configuration description data memory unit for storing configuration description data groups aligned in the order of their generation in the auxiliary direction of scanning;
   a second configuration description data memory unit for storing configuration description data groups which are being continuously processed;
   a memory control unit for controlling configuration description data memory units;
   a registered configuration data memory unit for storing registered configuration data groups indicating lengths of a prescribed configuration by which the prescribed configuration crosses the raster;
   a cross data point formation unit which receives configuration description data from said first or second configuration description data memory unit and refers to the registered configuration data stored within said registered configuration data memory unit to form a cross point data representative of the position where the scanning raster crosses the configuration corresponding to said configuration description data;

a continuation judging unit which judges whether or not said configuration crosses the ensuing raster and processes configuration description data which is the basis for said configuration for continuation, when said configuration crosses the ensuing raster, to cause this continuation data to be stored in the second configuration description data memory unit;

a picture element series data formation unit which forms a picture element series data based on the cross point data received from said cross point data formation unit;

a picture element series data memory unit for storing picture element series data associated with at least one scanning line of the raster; and a supply unit for supplying the picture element series data associated with the one scanning line which has been formed in said picture element series data memory unit to a subsequent processing unit.

12. A system for forming picture element series data comprising:

a first figure description data memory unit for storing figure description data groups aligned in the order of their generation in the auxiliary direction of scanning;

a second figure description data memory unit for storing figure description data being continuously processed;

a memory control unit for controlling figure description data memory units;

a registered configuration data memory unit for storing registered configuration data groups indicating lengths of portions of a prescribed normalized configuration by which the prescribed normalized configuration crosses the raster;

a cross point data formation unit which receives figure description data from said first or second figure description data memory unit and refers to the registered configuration data of said registered configuration memory unit to form a cross point data representative of the position where the scanning raster crosses the configuration corresponding to said figure description data;

a continuation judging unit which judges whether or not said configuration crosses the ensuing raster, and when having judged that said configuration crosses the raster, processes figure description data for continuation and causes the same to be stored in the second figure description data memory unit;

a picture element series data memory unit for storing the picture element series data associated with at least one scanning line of the raster;

a memory selection unit for forming a signal which selects from said picture element series data memory unit memory elements corresponding to picture elements between two cross points of said cross point data;

a tone control unit for causing tone data in the figure description data to be stored in the memory elements selected by said memory selecting unit; and a supply unit for supplying the picture element series data associated with one scanning line which has been formed in said picture element series data memory unit to a subsequent processing unit.

13. A system for forming picture element series data comprising:

a first configuration description data memory unit for storing registered configuration description data groups aligned in the order of their generation in the auxiliary direction of scanning and configuration description data descriptive of a parallelogram of which one set of opposing sides is parallel to the primary direction of scanning and a right angle triangle of which two sides subtending right angles are parallel to the primary or auxiliary direction of scanning;

a second configuration description data memory unit for storing configuration description data groups being continuously processed;

a memory control unit for controlling said two memory units;

a registered configuration data memory unit for storing registered configuration data groups indicating relative position of the points where the registered configuration crosses the raster;

a cross point data formation unit which receives configuration description data from said first or second memory unit and refers to registered configuration data in said registered configuration data memory unit as the need arises to form a cross point data representative of absolute position where the scanning raster crosses the configuration represented by said configuration description data;

a continuation judging unit for judging whether or not said configuration crosses the ensuing raster and when having judged that said configuration crosses the raster, processes said configuration description data for continuation and causes the same to be stored in the second configuration description data memory unit;

a picture element series data memory unit for storing the picture element series data associated with at least one scanning line of the raster;

a memory selecting unit for selecting memory elements corresponding to picture elements between the two cross points of said cross point data from said picture element series data memory unit to cause a signal indicating that the figure exists to be stored; and a supply unit for supplying the picture element series data associated with one scanning line which has been formed in the picture element series data memory unit to a subsequent processing unit.

* * * * *